(12) United States Patent
Cash

(10) Patent No.: US 9,101,824 B2
(45) Date of Patent: Aug. 11, 2015

(54) METHOD AND SYSTEM OF VIRTUAL GAMING IN A VEHICLE

(71) Applicant: Honda Motor Co., Ltd., Tokyo (JP)

(72) Inventor: Duane Matthew Cash, Mountain View, CA (US)

(73) Assignee: Honda Motor Co., Ltd., Tokyo (JP)

( * ) Notice: Subject to any disclaimer, the term of this patent is extended or adjusted under 35 U.S.C. 154(b) by 204 days.

(21) Appl. No.: 13/843,309

(22) Filed: Mar. 15, 2013

(65) Prior Publication Data

US 2014/0274378 A1   Sep. 18, 2014

(51) Int. Cl.
*A63F 13/00* (2014.01)

(52) U.S. Cl.
CPC ...................... *A63F 13/00* (2013.01)

(58) Field of Classification Search
CPC ......................................................... A63F 13/00
USPC ........................................................... 463/31
See application file for complete search history.

(56) References Cited

U.S. PATENT DOCUMENTS

| | | | |
|---|---|---|---|
| 5,055,890 A * | 10/1991 | Dawson et al. | 257/192 |
| 5,056,890 A | 10/1991 | Iino et al. | |
| 6,545,803 B1 | 4/2003 | Sakuma et al. | |
| 6,708,087 B2 | 3/2004 | Matsumoto | |
| 7,036,936 B2 * | 5/2006 | Hattori et al. | 353/13 |
| 7,537,522 B2 * | 5/2009 | Plavetich et al. | 463/36 |
| 2004/0102247 A1 * | 5/2004 | Smoot et al. | 463/36 |
| 2008/0311983 A1 * | 12/2008 | Koempel et al. | 463/31 |
| 2009/0091710 A1 * | 4/2009 | Huebner | 353/28 |
| 2009/0124382 A1 | 5/2009 | Lachance et al. | |
| 2009/0324138 A1 * | 12/2009 | Jung et al. | 382/312 |
| 2011/0053688 A1 * | 3/2011 | Crawford et al. | 463/31 |
| 2012/0223885 A1 | 9/2012 | Perez | |
| 2013/0147840 A1 * | 6/2013 | Seder et al. | 345/633 |

OTHER PUBLICATIONS http://spectrum.ieee.org/riskfactor/green-tech/advanced-cars/coming-soon-playing-holographic-games-in-the-backseat; Coming Soon: Playing Holographic Games in the Backseat; Robert Charette; Mon, Sep. 19, 2011.
http://www.geelab.rmit.edu.au/audi-urban-future-summit; AUDI Urban Future Summit, GEElab Contributors: Dr. Steffen P. Walz, Daniel Wahl; May-Sep. 2011.

* cited by examiner

*Primary Examiner* — David L Lewis
*Assistant Examiner* — Shauna-Kay Hall
(74) *Attorney, Agent, or Firm* — Rankin, Hill & Clark LLP

(57) ABSTRACT

A system and method for virtual gaming in a vehicle. The system and method include detecting a first set of image position data defining a first set of image position data defining a first position of images projected on a game surface. The system and method include detecting a set of player position data defining a gesture of one or more players relative to the first set of image position data and the game surface. The system and method include calculating a second set of image position data based on the first set of image position data and the set of player position data. The system and method include projecting images according to the second set of image position data on the game surface.

19 Claims, 4 Drawing Sheets

METHOD AND SYSTEM OF VIRTUAL GAMING IN A VEHICLE

BACKGROUND

Motor vehicles provide various opportunities for in-vehicle entertainment, including, but not limited to, music, television, movies and information based media content. Gaming can also be implemented in a vehicle through vehicle gaming systems coupled to in-vehicle displays and handheld gaming on portable gaming devices and mobile devices. Virtual and interactive gaming including the vehicle environment and vehicle occupants can provide a total in-vehicle entertainment experience.

SUMMARY

According to one aspect, a system for virtual gaming in a vehicle includes a first imaging device mounted in the vehicle with an image projection mechanism and an image capture mechanism. The image projection mechanism is configured to project images on a game surface, where the game surface is an environmental surface of the vehicle. The image capture mechanism is configured to detect a first set of image position data defining a position of the images relative to the game surface and detect a set of player position data defining a position of one or more players relative to the position of the images and the game surface. The system also includes a game module coupled to the first imaging device for processing the first set of image position data and the set of player position data to calculate a second set of image position data. The system further includes an image module coupled to the first imaging device for processing the first set of image position data and the set of player position data to calculate a second set of image position data and a processor for executing the game module and the image module.

According to another aspect, a computer-implemented method of virtual gaming in a vehicle includes detecting a first set of image position data defining a first position of images projected on a game surface, where the game surface is an environmental surface of the vehicle and detecting a set of player position data defining a gesture of one or more players relative to the first set of image position data and the game surface. The method also includes calculating a second set of image position data based on the first set of image position data and the set of player position data and projecting images according to the second set of image position data on the game surface.

According to a further aspect, a motor vehicle display system for virtual gaming includes an image device including a projector projecting a first set of images on a game surface, where the game surface is an environmental surface of the vehicle. The image device further includes a camera for monitoring a set of position data defining gestures of one or more vehicle occupants in relation to the first set of images and the game surface. The system also includes a controller coupled to the projector and the camera, the controller configured to calculate a second set of images based on a position of the first set of images and the set of position data defining the gestures and to command the projector to project the second set of images.

According to yet another aspect, a computer-implemented method of virtual gaming in a vehicle includes projecting images on a game surface from at least one image device mounted in the vehicle, where the game surface is an environmental surface of the vehicle. The method also includes tracking, from the image device, a first set of image position data defining a first position of the images relative to the game surface and a set of player position data defining a gesture of one or more players relative to the images and the game surface. The method further includes processing the first set of image position data and the set of player position data to generate a second set of image position data, and controlling the image device to project the images according to the second set of image position data.

DETAILED DESCRIPTION

Figure 1:
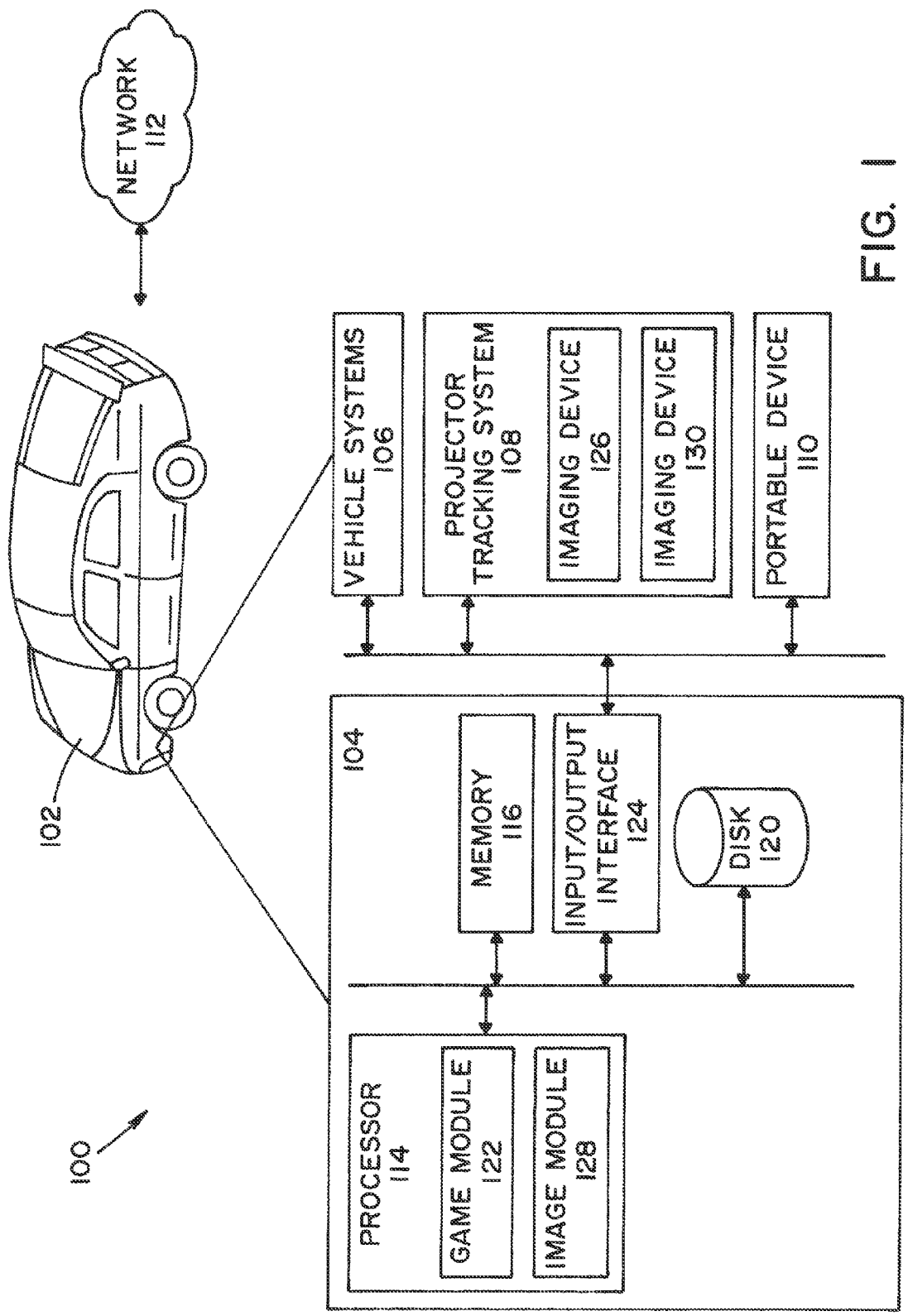
FIG. 1 is a schematic view of a vehicle computer system for virtual gaming in a vehicle according to an exemplary embodiment.

The following includes definitions of selected terms employed herein. The definitions include various examples and/or forms of components that fall within the scope of a term and that can be used for implementation. The examples are not intended to be limiting. Further, one having ordinary skill in the art will appreciate that the components discussed herein, can be combined, omitted or organized with other components or into organized into different architectures.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "game schema", as used herein, is a framework including instructions, libraries, and/or a logic executed by a processor that defines game play, a set of rules, themes and/or a set of game plots for an in-vehicle virtual game. Game schemas can include, but are not limited to, action, adventure, arcade, card, casino, education, racing, simulation, sports, strategy, trivia and word games.

A "gesture", as used herein, can be an action, movement and/or position of one or more players interacting in a virtual game. The gesture can be made by an appendage (e.g., a hand, a foot, a finger, an arm, a leg) of the one or more players. A gesture can also refer to a facial expression, including movement and/or position of the eyes or mouth of the one or more players. Gestures can be recognized using gesture recognition and facial recognition techniques known in the art.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, hardware, firmware, software in execution on a machine, and/or combinations of each to perform a function(s) or an action(s), and/or to cause a function or action from another module, method, and/or system. A module can include a software controlled microprocessor, a discrete logic circuit, an analog circuit, a digital circuit, a programmed logic device, a memory device containing executing instructions, and so on.

An "operable connection", or a connection by which entities are "operably connected", is one in which signals, physical communications, and/or logical communications can be sent and/or received. An operable connection can include a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, personal watercraft, and aircraft. In some cases, a motor vehicle includes one or more engines.

Referring now to the drawings, wherein the showings are for purposes of illustrating one or more exemplary embodiments and not for purposes of limiting same, FIG. 1 illustrates a vehicle computer system 100 for virtual gaming in a vehicle 102 according to an exemplary embodiment. The system 100 includes a computing device 104, a plurality of vehicle systems 106, a projector tracking system 108, a portable device 110 and a network 112. The computing device 104 generally manages, processes and controls the vehicle 102 and interactions with the other components of the system 100. The computing device 104 can be the main electronic control unit (ECU) on the vehicle 102 and can include a processor 114, a memory 116, an input/output interface 124 and a disk 120 to carry out said functionality.

The components of the system 100 will now be discussed in detail according to one exemplary embodiment. As shown, the plurality of vehicle systems 106 generally include one or more systems controlled by a vehicle 102 that provide various functions to the vehicle 102. Exemplary vehicle systems include, but are not limited to, an engine/ignition system, a braking system, a collision mitigation system, a blind spot indicator system, a heating air and ventilation system (HVAC), an audio system, a telematics system, a navigation system and so on. The vehicle systems 106 can be operably connected to the computing device 104 via a vehicle bus (not shown). Data from the vehicle systems 106 can also be exchanged with the computing device 104 via the vehicle bus.

The portable device 110 can be operably connected to the computing device 104. In certain embodiments, the portable device 110 can be operably connected for computer communication to the network 112. The network 112 is, for example, a data network, the Internet, a wide area network, a local area network, etc. The network 112 serves as a communication medium between the vehicle 102 and various devices located remotely from the vehicle 102, for example, servers (e.g., web servers), client machines and other devices (not shown). The computing device 104, in some embodiments, may exchange data with the network 112.

The projector tracking system 108 includes a first imaging device 126 and a second imaging device 130, although it is contemplated that the projector tracking system 108 can include any number of imaging devices. The projector tracking system 108 generally captures, projects and processes imaging associated with in-vehicle gaming. The imaging devices 126, 130 can be any electronic imaging device known in the art configured to project virtual images and capture virtual and real image data. Exemplary imaging devices include, but are not limited to, digital cameras, digital video cameras, projectors and imaging sensors. The first and second imaging devices 126, 130 can be mounted in the vehicle 102.

Figure 2:
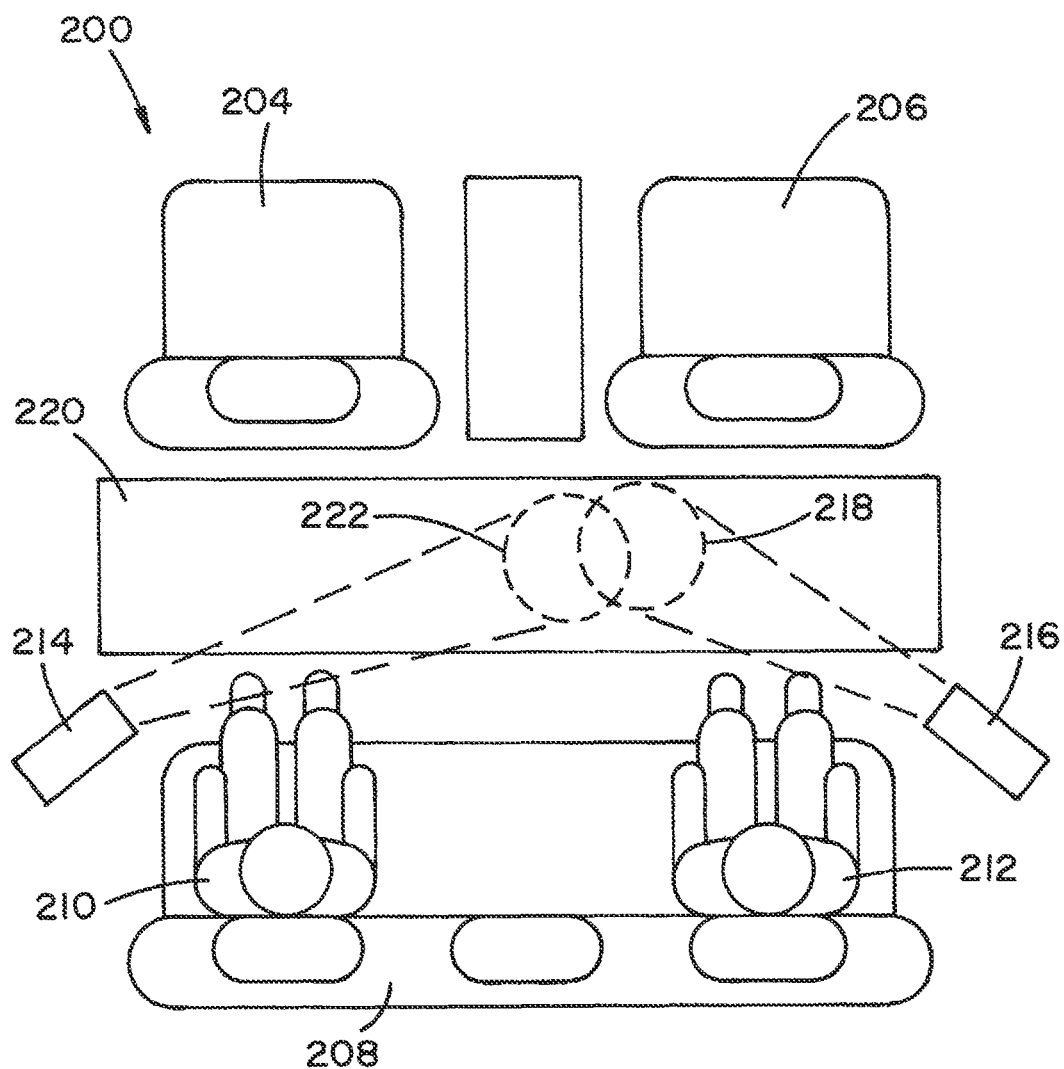
FIG. 2 is a top view of an interior of a vehicle implementing a computer system for virtual gaming according to an exemplary embodiment.

Referring now to FIG. 2, a vehicle interior 200 (i.e., an environment) of the vehicle 102 implementing a system for virtual gaming according to an exemplary embodiment is illustrated. The interior 200 of the vehicle 102 can include a first front seat 204, a second front seat 206 and a rear seat 208, though other configurations could be provided. A first vehicle occupant 210 and a second vehicle occupant 212 are seated on the rear seat 208. A first imaging device 214 is mounted to the left of the first vehicle occupant 210 and a second imaging device 216 is mounted to the right of the second vehicle occupant 212. The first and second imaging devices 214, 216 are used to project and capture images in the vehicle environment 200, for example a first image 218 and a second image 222, for in-vehicle virtual gaming.

In the illustrated embodiment, the first and second imaging devices 214, 216 are laterally spaced from one another. However, it is appreciated that the first and second imaging devices 214, 216 can be mounted in or on other various locations within the cabin of the vehicle 102, for example, the vehicle ceiling (not shown), the rear seat 208, a head rest of the first front seat 204 or the second front seat 206, a vehicle floor 220, among others.

One having ordinary skill in the art will understand that other imaging devices located in, on or controlled by the computing device 104 can be used in conjunction with the first and second imaging device 214, 216 for in-vehicle virtual gaming. Further, the portable device 110 can also include an imaging device (e.g., a camera phone) that can be used in conjunction with the first and second imaging device 214, 216 for in-vehicle virtual gaming. The projector tracking system 108 and/or the processor 114 can be configured to receive signals from the aforementioned other imaging devices to process with the signals and/or position data received from the first and second imaging device 214, 216.

Figure 3:
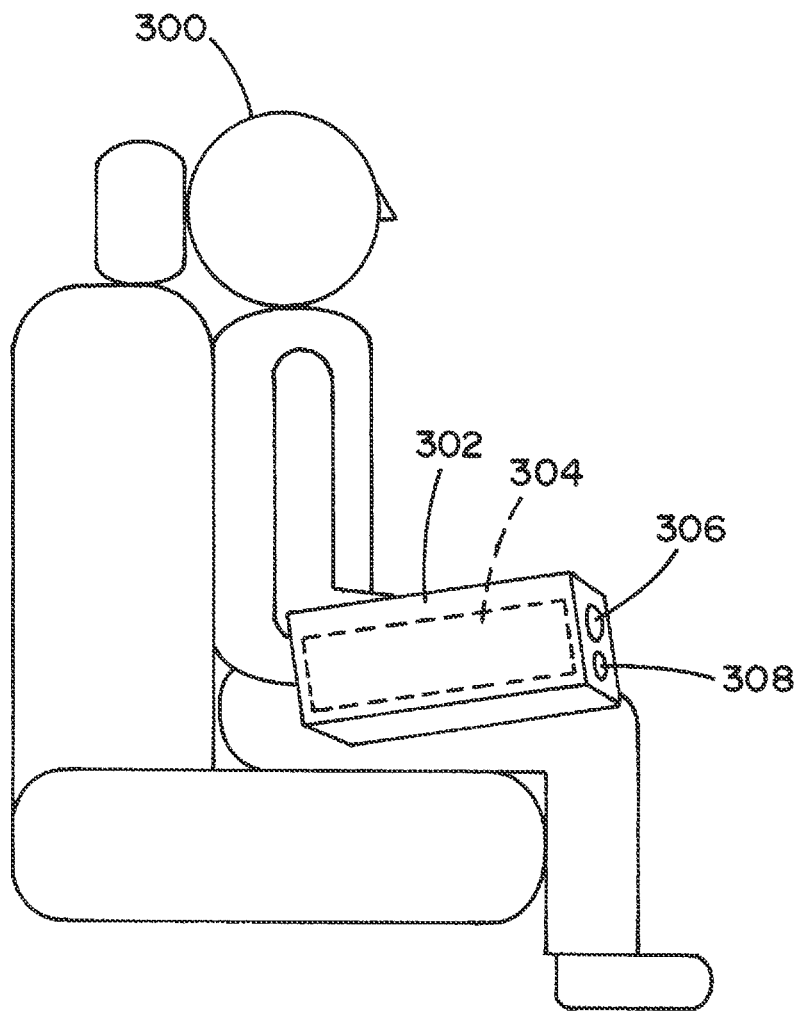
FIG. 3 is a side view of a vehicle occupant and an imaging device of FIG. 2.

FIG. 3 illustrates a side view of the vehicle interior 200 of FIG. 2 including a vehicle occupant 300 (e.g., a first or second vehicle occupant 210, 212 of FIG. 2) and an arm rest 302 located adjacent to the vehicle occupant 300. An imaging device 304 is located in the arm rest 302 and includes an image projection mechanism 306 and an image capture mechanism 308. By using multiple imaging devices, with dual image capture and image projection mechanisms, detection and projection of virtual images is facilitated by shadow occlusion as is known in the art.

Although the image projection mechanism 306 and the image capture mechanism 308 are positioned vertically spaced from one another in the illustrated embodiment, one having ordinary skill in the art will appreciate that other positioning arrangements are possible. Further, it is appreciated that the image projection mechanism 306 and the image capture mechanism 308 can be integral components of the arm rest 302 as shown, or as separate components of the arm rest 302.

Referring again to the system 100 and the computing device 104, the processor 114 (e.g., a controller, ECU) can include a game module 122 and an image module 128 for implementing in-vehicle gaming. It is appreciated, that in some embodiments, the projector tracking system 108 could include and/or perform the functions of the game module 122 and/or the image module 128 using the processor 114 or a separate processor integrated with the projector tracking system 108. In further embodiments, the portable device 110 or the network 112 could also perform the function of the game module 122 and/or the image module 128 by communicating with the computing device 104 or processor 114 or the projector tracking system 108.

In the illustrated embodiment, the processor 114 is configured to transmit, receive and process signals from the memory 116, the input/output interface 124, the disk 120, the vehicle systems 106, the projector tracking system 108 and the portable device 110. The game module 122 and the image module 128 execute and perform functions in conjunction with the processor 104 for in-vehicle virtual gaming as described throughout.

Figure 4:
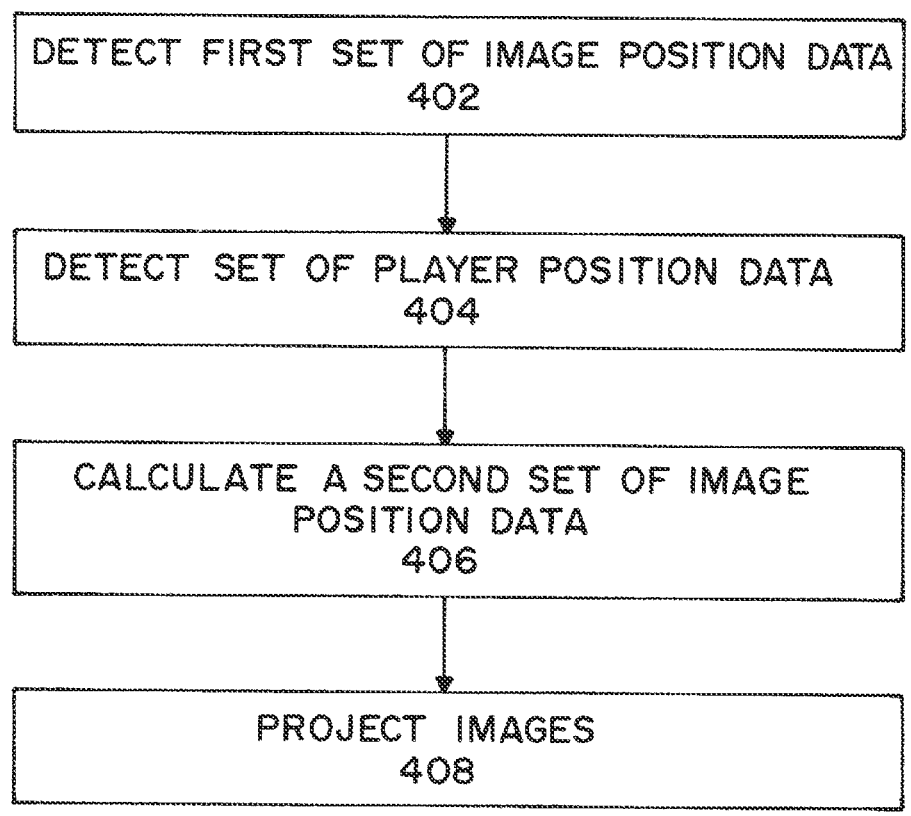
FIG. 4 is a process flow diagram of a method for virtual gaming in a vehicle according an exemplary embodiment.

Referring now to FIG. 4, a computer implemented method of virtual gaming in a vehicle is shown according to an exemplary embodiment. In particular, the method will be described in association with the computer system 100 and FIGS. 1-3, though it is to be appreciated that the method could be used with other systems. At step 402, the method includes detecting a first set of image position data defining a first position of images projected on a game surface. The images can be virtual images (e.g., images 218 and 222), projected, by for example, the image projection mechanism 306, or real images (i.e., other objects in relation to the game surface). The image capture mechanism 308 can detect images and extract position data defining a position of the images.

The game surface is an environmental surface of the vehicle. Exemplary environmental surfaces include, but are not limited to, the floor 220 and a back of the first front seat 204 and/or a back of the second front seat 206. In particular, the environmental surface of the vehicle 102 can include at least one of or both the floor 220 of the vehicle, the back of the first front seat 204, and the back of the second front seat 206.

At step 404, the method further includes detecting a set of player position data defining a gesture or a position of one or more players relative to the first set of image position data and the game surface. For example, in FIG. 2, the first and second imaging devices 214, 216 can detect gestures or motions of the first vehicle occupant 210 and/or the second vehicle occupant 212 with respect to the game surface (i.e., the vehicle floor 220) and/or the first set of image position data, for example, the image position data associated with the images 218, 222. The image capture mechanism 308 can be configured to detect the set of player position data using techniques known in the art (e.g., gesture recognition, facial recognition, etc.). In another embodiment, the gestures or positions of the one or more players can be monitored or tracked by the image capture mechanism 308.

At step 406, the method further includes calculating or processing a second set of image position data based on the first set of image position data and the set of player position data. The second set of image position data represents the output (e.g., position) of virtual images based on the original position of the images (i.e., defined by the first set of image position data) and the interaction of the players (i.e., defined by the set of player position data).

The game module 122 of the processor 114 can be configured to receive the first set of image position data and the set of player position data from the projector tracking system 118. The game module 122 can further calculate the second set of image position data. In another embodiment, the projector tracking system 108 can be configured to calculate the second set of image position data.

The second set of image position data can also be generated or processed based on a game schema defined by the game module 122 and executed by the processor 114. The game schema can be stored in the computing device 104 (e.g., in the memory 116 or the disk 120). Alternatively, the game schema can be obtained (e.g., a download) or accessed via the portable device 110 or the network 112.

In one example, the game schema is modeled after a soccer game. For example, the images 218, 222 can be an image of soccer ball. The first vehicle occupant 210 and the second vehicle occupant 212 can "kick" the soccer ball with appropriate gestures in relation to the floor 220. In another example, the game schema is modeled after a toy car game. For example, the images 218, 222 can be a an image of a toy car that the first vehicle occupant 210 and the second vehicle occupant 212 control using gestures to "drive" the virtual car on the floor 220. One having ordinary skill in the art will realize that other game schemas known could be implemented with the system(s) and method(s) described herein.

At step 408, the method further includes projecting the images according to the second set of image position data on the game surface. The image projection mechanism 306 can be controlled to project images according to the second set of image position data. For example, the image module 128 can send a signal indicating the second set of image position data to projector tracking system 108 in order to control the output of one or both of the imaging devices 126, 130, and in particular, the image projection mechanisms associated with the imaging devices 126, 130.

In the illustrated embodiment shown in FIG. 2, the second set of position data is projected as virtual image 222 by the imaging devices 214 and 216. The virtual image 222 is based on the first set of position data (i.e., the original position of the image 218) and the set of player position data. In this example, one or both of the vehicle occupants 210, 212 performed an action or gesture, defined by the set of player position data, with the image 218, defined by the first set of position data, resulting in image 222, defined by the second set of position data.

One having ordinary skill in the art will realize from the systems and methods described herein, and in particular, the first and second imaging devices, in-vehicle gaming can become a total vehicle entertainment experience. It will be appreciated that various modifications of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for virtual gaming in a vehicle, comprising:
    a first imaging device mounted in the vehicle;
    a second imaging device mounted in the vehicle;
        wherein the first imaging device and the second imaging device and have an image projection mechanism and an image capture mechanism, the image projection mechanism configured to project images on a game surface, wherein the game surface is an environmental surface of the vehicle, the image capture mechanism configured to detect a first set of image position data defining a position of the images relative to the game surface and detect a set of player position data defining a position of one or more players relative to the position of the images and the game surface;
        a game module coupled to the first imaging device and the second imaging device for processing the first set of image position data and the set of player position data to calculate a second set of image position data based on a game schema;
        an image module coupled to the first imaging device and the second imaging device for controlling the image projection mechanism to project images according to the second set of image position data;
        wherein the first imaging device and the second imaging device are both configured to detect and project the images; and
    a processor for executing the game module and the image module.

2. The system of claim 1,
    wherein the first and second imaging device are mounted on a rear seat of the vehicle.

3. The system of claim 1, wherein the environmental surface of the vehicle includes at least a floor of the vehicle.

4. The system of claim 1, wherein detecting the set of player position data further includes recognizing a gesture of the one or more players.

5. The system of claim 1, wherein the image capture mechanism is a camera.

6. A computer-implemented method of virtual gaming in a vehicle, comprising:
    detecting a first set of image position data defining a first position of images projected on a game surface, wherein the game surface is an environmental surface of the vehicle;
    detecting a set of player position data defining a gesture of one or more players relative to the first set of image position data and the game surface;
    calculating a second set of image position data based on the first set of image position data, a game schema and the set of player position data; and
    projecting images according to the second set of image position data on the game surface.

7. The computer-implemented method of claim 6, wherein the environmental surface of the vehicle includes at least a floor of the vehicle.

8. The computer-implemented method of claim 6, wherein the vehicle includes an image device having an image projection mechanism for projecting the images.

9. The computer-implemented method of claim 8, the image device further including an image capture mechanism for detecting the first set of image position data and the set of player position data.

10. The computer-implemented method of claim 8, the image device mounted on a rear seat of the vehicle.

11. A motor vehicle display system for virtual gaming, comprising:
    an image device including a projector projecting a first set of images on a game surface, wherein the game surface is an environmental surface of the vehicle, the image device further including a camera for monitoring a set of position data defining gestures of one or more vehicle occupants in relation to the first set of images and the game surface; and
    a controller including a game module and an image module, the controller coupled to the projector and the camera, the controller configured to calculate a second set of images based on a position of the first set of images, a game schema and the set of position data defining the gestures and to command the projector to project the second set of images.

12. The system of claim 11, wherein the image device is mounted on a rear seat of the vehicle.

13. The system of claim 12, further including a second image device mounted on the rear seat of the vehicle laterally spaced with respect to the image device.

14. The system of claim 11, wherein the environmental surface includes at least a floor of the vehicle and a back of a front seat.

15. A computer-implemented method of virtual gaming in a vehicle, comprising:
    projecting images on a game surface from at least one image device mounted in the vehicle, wherein the game surface is an environmental surface of the vehicle;
    tracking, from the image device, a first set of image position data defining a first position of the images relative to the game surface and a set of player position data defining a gesture of one or more players relative to the images and the game surface;
    processing the first set of image position data and the set of player position data to generate a second set of image position data based on a game schema; and
    controlling the image device to project the images according to the second set of image position data.

16. The computer-implemented method of claim 15, wherein the environmental surface is at least a floor of the vehicle.

17. The computer-implemented method of claim 15, wherein the image device includes a projector mechanism for projecting the images.

18. The computer-implemented method of claim 15, wherein the image device includes a camera mechanism for tracking the first set of image position data and the set of player position data.

19. The computer-implemented method of claim 15, wherein processing further includes generating the second set of image position data based on a game schema.

* * * * *